Nov. 7, 1950 D. L. BLANEY 2,528,682
MAGNETIC HEAD TESTING SYSTEM
Filed Oct. 29, 1948
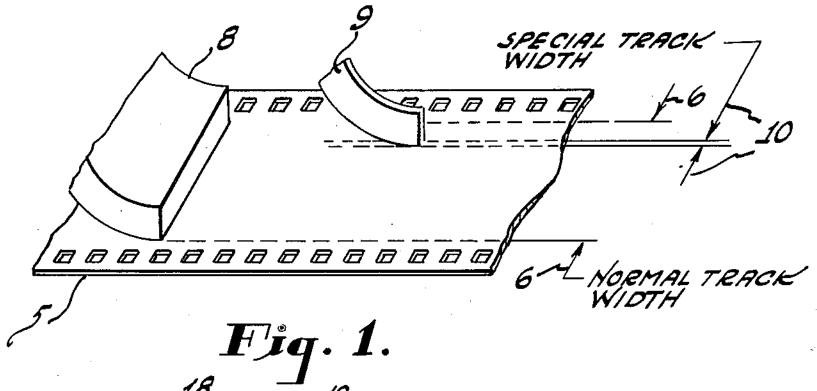
Fig. 1.
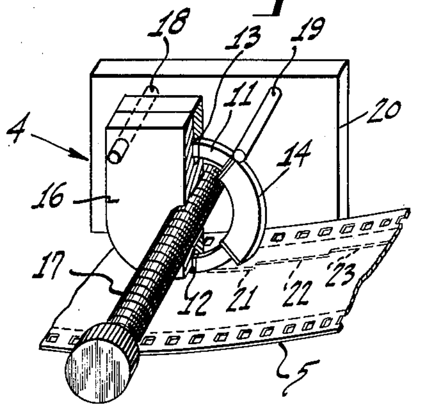
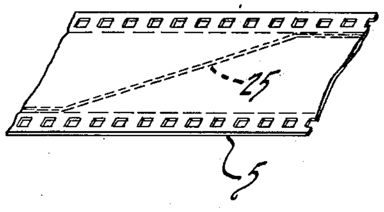
Fig. 2. Fig. 3.
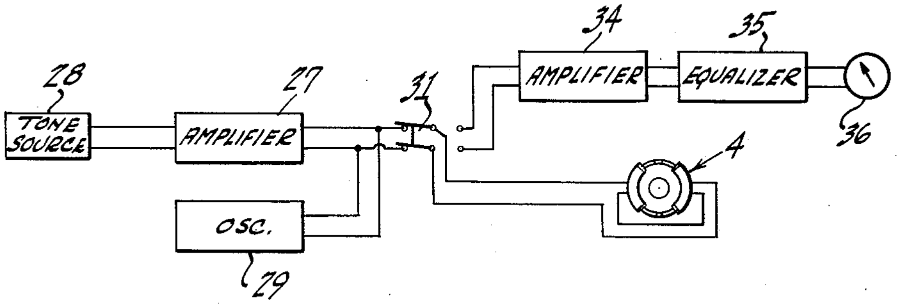
Fig. 4.
INVENTOR.
DOROTHY L. BLANEY
BY [signature]

Patented Nov. 7, 1950 2,528,682

UNITED STATES PATENT OFFICE 2,528,682

MAGNETIC HEAD TESTING SYSTEM

Dorothy L. Blaney, Los Angeles, Calif., assignor to Radio Corporation of America, a corporation of Delaware Application October 29, 1948, Serial No. 57,353

5 Claims. (Cl. 179—100.2)

This invention relates to magnetic recording, and particularly to a method of and system for testing the contact between a recording or reproducing head and the magnetic film or tape being advanced over or passed by the head.

It is well known that, in the recording of magnetic records, a magnetic tape without sprocket holes or a magnetic film with sprocket holes along one or both edges thereof, may be used as the record medium. Recording and reproducing heads may also be of various widths, depending upon the track record width desired, many tracks having a width in the neighborhood of 200 to 250 mils, the film being run in contact with the head at the recording or reproducing gap. The film or tape is directed or guided to and from the heads by guide rollers or capstans, the heads generally being mounted on separate supports from those of the guide rollers. Thus, it is not unusual to find that non-uniform contact exists longitudinally of the gap, or transversely of the magnetic sound record, due to improper adjustment of the head or the shifting of the head during the course of operation. In recording, this results in a loss of signal amplitude, particularly in the high frequency region, while in reproducing, a similar distortion is introduced.

The present invention is directed to a system of testing the uniformity of the contact between the film or tape and the gap in the head, and may also be used to provide a test track or record which may be used at any time for determining the adjustment of the heads. This test track is somewhat similar in nature to the photographic test film for testing printers, such as disclosed and claimed in Blaney U. S. Patent No. 2,255,644 of September 9, 1941, except that the tracks are positioned in serial order.

The principal object of the invention, therefore, is to facilitate the testing of magnetic recording and reproducing heads.

Another object of the invention is to provide an improved testing method and system for determining the uniformity of contact between a magnetic film or tape and the recording or reproducing head gap.

A still further object of the invention is to provide an improved magnetic test record for determining the uniformity of contact between the recording or reproducing head gap and the tape or film passing thereover.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a perspective view showing the relationship between a normal recording or reproducing head and the test track head.

Fig. 2 is a perspective view, partially in cross-section, showing the test head and one form of test track.

Fig. 3 shows another form of test track which may be recorded with the test head, and Fig. 4 is a diagrammatic view of the testing system.

Referring now to the drawings, in which the same numerals identify like elements, a magnetic film or tape 5 may have thereon a recording area of a width as shown by the arrows 6, this area, for purposes of explanation, being shown spanned by one pole piece 8 of a normal recording or reproducing head. One commercial width of this track and head 8, which has been successfully used, was in the neighborhood of 200 mils. Also, as illustrated in Fig. 1, a core section 9 is shown which may be one lamination of the core of a normal recording or reproducing head, the width thereof being in the neighborhood of four to six mils, as indicated by the arrows 10. Thus, a special test recording and reproducing head 4 is constructed of a single lamination, such a head being shown in Fig. 2 as having two semicircular core sections of one lamination, one section being shown at 11, with diametrically opposed gaps 12 and 13. The activating coils surround the cores, one coil being shown at 14, the entire cores and coils being mounted in a block 16, threadedly mounted on a hand screw 17, and slidable on a pair of pins 18 and 19.

In the construction shown in Fig. 2, the gap 12 may be moved transversely of the film 5 by rotation of the screw 17 in the fixed mount 20. As shown in Fig. 2, three tracks are diagrammatically represented by dotted lines 21, 22, and 23, other tracks being similarly recorded across the entire record area. The length of each of the tracks 21, 22, and 23 may be approximately ten feet in length or at least sufficiently long to permit a volume or level reading to be made. To record a series of such tracks, the tape 5 is passed over the gap 12 and the screw 17 is rotated periodically to provide a series of narrow, equally spaced, magnetic tracks of a constant amplitude signal, which may preferably have a constant frequency. The spaces between the tracks may be substantially the same width as the tracks. Since the magnetic head is narrow, such as six thousandths of an inch, a good contact will be made between the tape 5 and the gap 12 at all points transversely of the record area, and, with a signal of constant amplitude being impressed on the head, each track, such as shown at 21, 22, and 23, will have a constant amplitude recorded therein.

If tape 5 is now reproduced in a standard reproducer with a head of the width such as shown at 8 in Fig. 1, and the output connected to a volume indicator, the volume indicator should read a constant value, regardless of which track is being reproduced. If, however, the spacing between the tape and head varies, the output will vary accordingly, the output decreasing as the space between the gap and tape increases. If desired, a graph could be plotted between track positions across the tape and output as the tape 5 progresses past the standard reproducing head to indicate the exact contact of each point corresponding to a certain track position.

If the screw 17 is turned continuously as the tape is advanced past the gap 12, a diagonal track such as shown at 25 in Fig. 3 will be produced. The reproduction of this track with a standard width reproducer head will also indicate the uniformity of contact between the tape and the reproducing head.

The test head may also be used in another manner, which involves recording a constant amplitude tone or signal with the normal recording head, such as shown at 8, and then reproducing the record so made with the special test head 4 which is moved transversely across the record as the film advances. If the output of the special head is constant at all positions across the track, uniform contact during recording is indicated. If the output varies, however, the desired uniformity of contact did not exist during recording.

Referring now to Fig. 4, the special head 4 may be connected to an amplifier 27 fed by a constant tone source 28, and which, to simulate the usual recording conditions, modulates a bias frequency from an oscillator 29. When a switch 31 is thrown to the left, the constant tone source will be impressed on the head 4 and a plurality of tracks, such as shown at 21, 22, and 23, may be recorded, or, as shown at 25 in Fig. 3. To reproduce with the test head 4, switch 31 is thrown to the right and the output of head 4 fed into an amplifier 34 and through the usual equalizer 35 to the volume indicator 36. In the method mentioned above, wherein a full width track record is recorded at a constant amplitude level, the output of the amplifier 27 and oscillator 29 are impressed on a recording head of the width shown at 8, and the reproduction is then accomplished with the special head 4.

To make a test record similar to the photographic record shown in the above mentioned Blaney patent, a plurality, such as twenty or more, narrow, parallel tracks, equally spaced, transversely and serially positioned longitudinally, are recorded with the special head 4, which may be kept and used as a test record for determining uniformity of contact between normal operating recording and reproducing heads. The test track is reproduced by either the recording or reproducing head to be tested and the output measured in the manner mentioned above. Although the test head has been described as one having only a single lamination of from three to six mils in thickness, it is to be understood that it is possible to use more than one thin lamination, or a lamination of greater thickness, depending upon the width of normal track to be tested.

I claim:

1. A test system for determining the uniformity of contact between the gap of a magnetic head and the magnetic record medium passing thereover, comprising a head to be tested, a magnetic recording head of narrow width compared with the width of said head to be tested, said narrow head making firm contact with said magnetic record medium at all times said medium passes thereover, means for recording with said narrow head a series of parallel spaced narrow tracks transversely of the record area of said medium in a serial order, means including said magnetic head to be tested for reproducing said plurality of narrow tracks, and means for indicating the output of said tracks during the reproduction thereof by said head to be tested.

2. A test system in accordance with claim 1, in which said narrow recording head has a gap length of substantially five mils for a track width approximately 200 mils, each of said narrow tracks being approximately ten feet in length, and the spaces between said tracks being substantially the same width as said tracks.

3. A test system for determining the uniformity of contact lengthwise of the gap of a magnetic head and the magnetic record medium passing thereover, comprising a magnetic head to be tested, said head having a standard gap length, a magnetic head having a gap length shorter than the length of said gap of said head to be tested, and adapted to make firm contact with said magnetic record medium at all times said medium passes thereover, means for utilizing one of said heads to provide a magnetic record on said medium reproducible in narrow portions transversely disposed in the record area covered by the gap of the head to be tested, and means for measuring the amplitude of said record being reproduced.

4. A test system in accordance with claim 3, in which said magnetic head having a gap of short length records said record, and said head having a gap of longer length reproduces said record.

5. A test system in accordance with claim 3, in which said magnetic head having a gap of long length records said record, and said head having a gap of short length reproduces said record.

DOROTHY L. BLANEY.

REFERENCES CITED

The following references are of record in the file of this patent:

UNITED STATES PATENTS

| Number | Name | Date |
|---|---|---|
| 2,180,972 | Wohlrab | Nov. 21, 1939 |

FOREIGN PATENTS

| Number | Country | Date |
|---|---|---|
| 221,638 | Switzerland | Sept. 1, 1942 |

OTHER REFERENCES

Head Alignment, Murphy & Smith, Audio Engineering, Jan. 1948.